Jan. 1, 1952

R. L. DUGGER 2,580,532

TRACTOR HITCH FOR AGRICULTURAL IMPLEMENTS

Filed May 12, 1950

INVENTOR.
Richard L. Dugger
BY
Christian R. Nielsen
Attorney

Jan. 1, 1952          R. L. DUGGER          2,580,532

TRACTOR HITCH FOR AGRICULTURAL IMPLEMENTS

Filed May 12, 1950          3 Sheets-Sheet 2

INVENTOR.
Richard L. Dugger
BY
Christian R. Nielsen.
Attorney

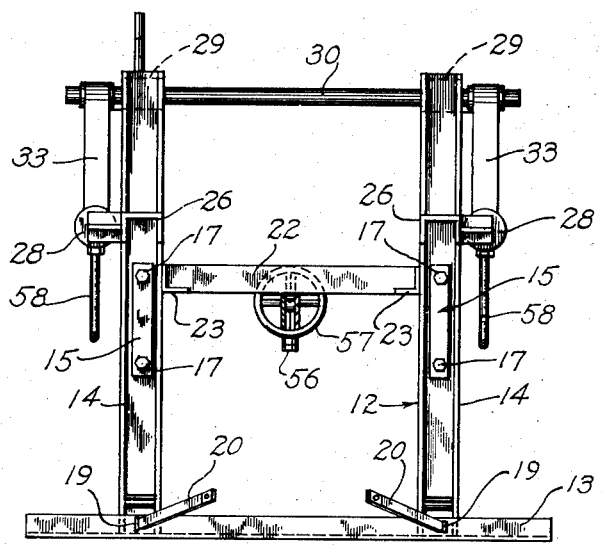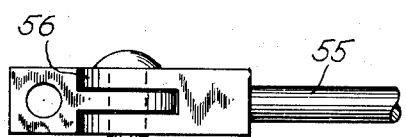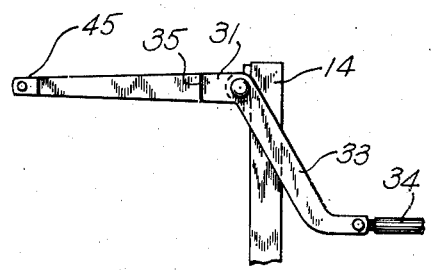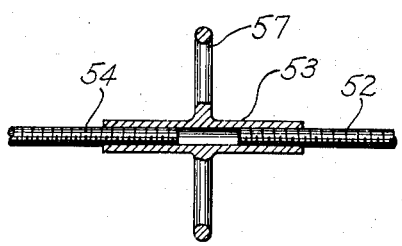

Patented Jan. 1, 1952

2,580,532

UNITED STATES PATENT OFFICE 2,580,532

TRACTOR HITCH FOR AGRICULTURAL IMPLEMENTS

Richard L. Dugger, Hammon, Okla.

Application May 12, 1950, Serial No. 161,640

2 Claims. (Cl. 97—50)

This invention relates to a tractor hitch for agricultural implements and it consists in the constructions, arrangements and combinations herein described and claimed.

It is the cardinal object of the invention to provide a unitary tractor hitch embodying means for ready attachment to various types of tractors and wherein a hydraulic means is embodied in the hitch associated with mechanism for controlling the proper operative positions of working implements of machines which may be attached to the hitch device.

It is also an object of the invention to provide a tractor hitch embodying a three point attachment for agricultural implements which may be readily and quickly detached or attached to various makes of tractors and having means for efficiently controlling operative positions of various working implements of a machine attached to the hitch, there being means for obtaining various adjustments of levers and links for varying the operative positions of the working implements.

A still further object of the invention is to provide a hitch device which is constructed so that implements coupled behind a tractor can be shifted or changed with a minimum of effort, the hitch including connections with the implement drawn, being of a universal form providing flexibility and proper adjustment of working elements to meet various conditions which may be encountered.

Additional objects, advantages and features of invention will be apparent from the following description considered in conjunction with the accompanying drawings, wherein Figure 1 is a fragmentary top plan view of a tractor having the hitch device connected therewith.

Figure 4 is a rear elevation thereof.

Figure 5 is a side elevation of a bell crank lever associated with a hydraulic operating unit.

Figure 7 is a sectional view of the adjusting means associated with the implement control rod.

Figure 8 is a detail elevation of one of the pivotal connections for the control rod.

Figure 1:
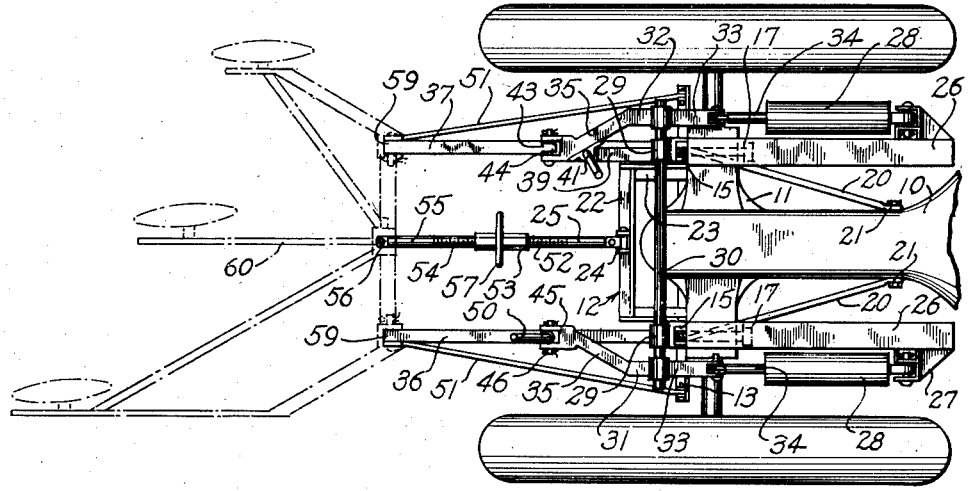

Reference is first invited to Figure 1 of the drawings, wherein there is illustrated the rear portion of a tractor 10, the axle housing 11 of which forms the base for mounting of the hitch device generally indicated at 12.

Figure 2:
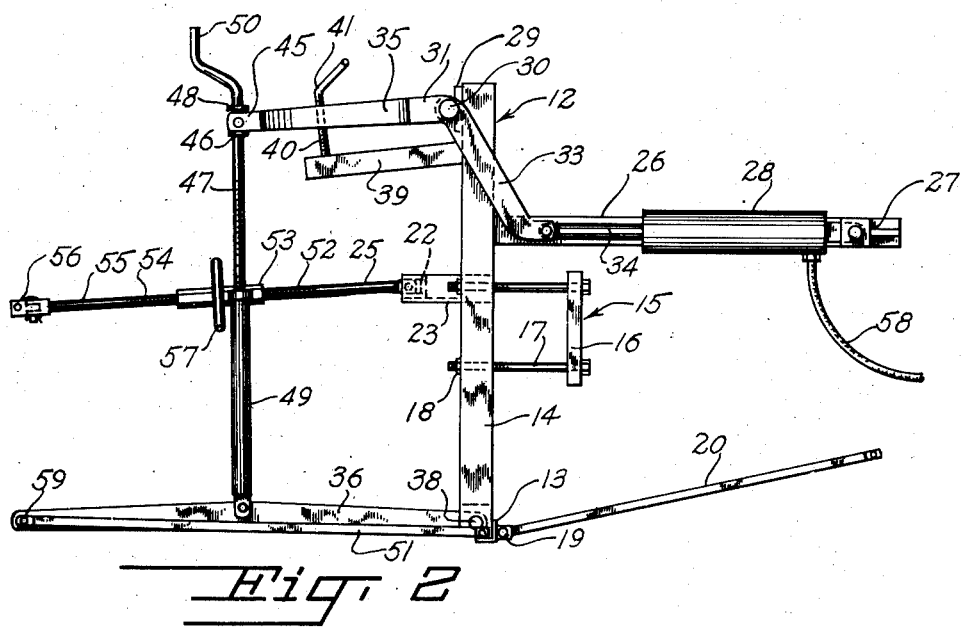
Figure 2 is a side elevation of the hitch device detached from the tractor.
Figure 3:
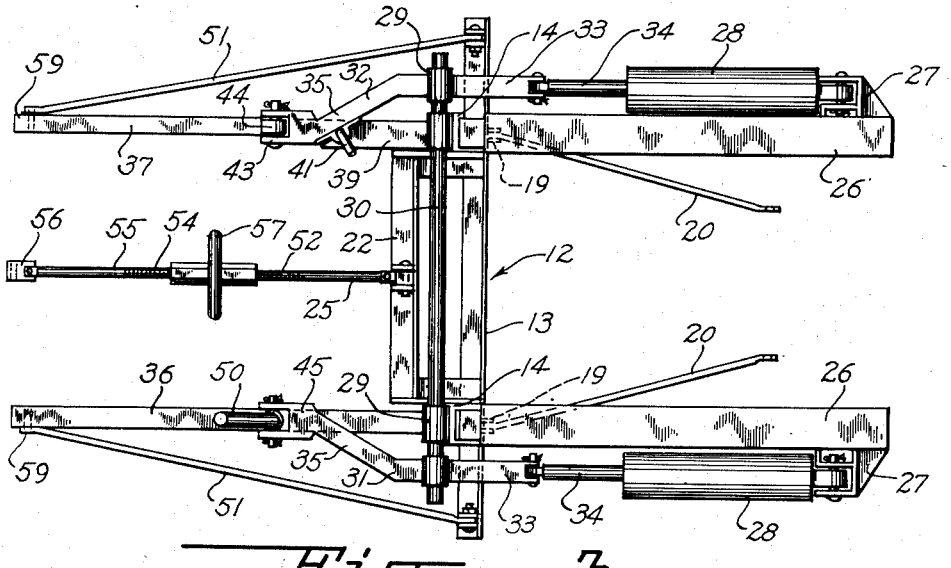
Figure 3 is a top plan view thereof.

As best seen in Figures 2 and 3, a transverse angle iron 13 has welded thereto a pair of spaced vertical channel members 14, the ends of the angle iron 13 extending beyond the channel members a distance for a purpose to be explained. Intermediately of the height of the channel members 14 a pair of spaced openings are provided for securing a clamp 15 which in the present instance, comprises a heavy flat steel plate 16 having openings adapted to register with the openings in the vertical channel members 14. Heavy bolts 17 are extended through the aligned openings in the plate 16 and the channel members 14, the plate 16 being drawn into tight clamping engagement upon the axle housing 11 by nuts 18 engaged upon the threaded ends of the bolts. As clearly shown in Figure 1, two of the clamps are inherent, one disposed upon opposite sides of the axle housing. If desired a plurality of openings may be embodied in the upright channel members 14, enabling the clamp to be positioned at varying heights so as to accommodate the hitch to tractors of different heights.

The angle iron 13 also has a pair of ears 19 spaced in alignment with the upright channels 14, a truss rod 20 being connected between each pair of ears 19 and extended diagonally forward and secured to the housing 11 as indicated at 21.

A bar 22 is connected between the upright channel members 14 and as shown comprises, a U-shaped frame, respective legs 23 of which are connected, as by welding, to the channel members, the bar extending horizontally and preferably the bar 22 is located above the medial height of the channel members. The bar 22 is an angle iron and has a pair of upstanding ears 24 for pivotal mounting of an implement control rod 25, as will be presently described.

Above the bar 22 and extending horizontally forward therefrom an arm 26 is secured to each upright channel 14, the extremity of each arm having a bracket 27 secured thereto, these brackets being secured to the outer face of the arms and form a pivotal mounting for one end of respective hydraulic cylinders 28.

Upon the upper ends of the upright channels 14 a bearing 29 is secured, the bearings being in horizontal alignment for oscillatably mounting a rock shaft 30. The shaft 30 projects beyond the bearings 29 a distance for mounting respective bell crank levers 31 and 32, each of the levers having a short arm 33 pivotally connected to a piston rod 34 of respective hydraulic cylinders 28. The longer end of the levers 31 and 32 is inwardly offset as at 35 to overlie respective draw bars 36 and 37, the draw bars being pivotally connected to the lower ends of the upright channel members 14 as indicated at 38 and extend rearwardly a substantial distance to form a pair of respective connecting means for an implement to be drawn by the tractor.

Figure 9:
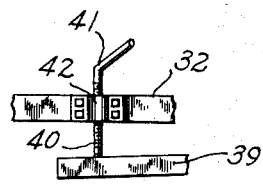
Figure 9 is a fragmentary side elevation of an adjustable stop employed in the device.
Figure 10:
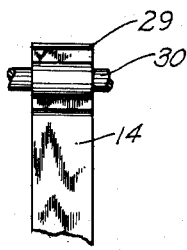
Figure 10 is a fragmentary detail of one of the bearings for the rock shaft.
Figure 6:
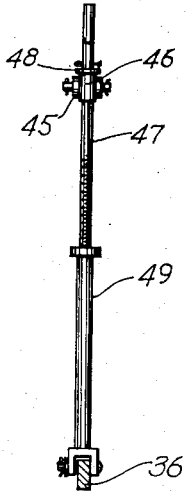
Figure 6 is an elevational view partly in section, illustrating an adjustable leveling connection rod.

Beneath the offset portion 35 of the lever 32 there is an arm 39 secured to the next adjacent upright channel member 14, in the path of a bolt 40 of an adjusting crank 41. The bolt 40 is threaded and engaged in a threaded bearing 42 (see Figure 9). It will be apparent that by rotating the crank and bolt the lever 32 may be raised and lowered. The lever 32 has a fork 43 for pivotally mounting one end of a link 44, the other end of the lever being connected to the draw bar 37. The lever 31 has a fork 45 between the ears of which there is a pivotal bearing 46 for rotatably supporting a shaft 47. The shaft 47 has a fixed collar 48 in engagement with the upper end of the bearing 46. An interiorly threaded cylinder 49 has one end pivotally connected to the draw bar 36, the upper open end receiving the threaded portion of the shaft 47. Thus a pivotal connection is provided between the shaft 47 and the lever 31, permitting a rocking movement of the lever so as to adjust the draw bar 36. A crank 50 integrally formed with the shaft 47 enables ready rotation of the shaft to raise and lower the draw bar 36. The draw bars 36 and 37 are stabilized by respective brace bars 51 pivotally connected at the rear ends of the draw bars and the ends of the channel iron member 13.

The implement control rod 25 is threaded as at 52 and receives thereon one end of a threaded sleeve 53, the opposite end of the sleeve receiving the threaded end 54 of a rod 55. The threaded portion of the rod 25 may be right handed while the threads of the rod 55 may be left handed or vice versa, so that when the sleeve 53 is rotated the rods 25 and 55 may be drawn together or moved apart to shorten or lengthen the combined length of the rods. Upon the extremity of the rod 55 a pivotal coupling 56 is provided forming the third and final connection with an implement. In order that the sleeve 53 may be readily rotated a hand wheel 57 is integrally formed upon the sleeve.

Each of the hydraulic cylinders 28 is actuated by fluid from the hydraulic unit of the tractor through a flexible hose 58, the fluid being controlled by a suitable control valve (not shown) as will be understood.

The operation of the hitch will be readily understood from the following description, it being understood that the implement to be drawn is connected to respective draw bars 36 and 37 at the rear ends 59 and that these draw bars are located at a position adjacent the ground forming two points of connection with the implement. The third point of connection to the implement is effected by securement to the coupling 56 of the control arm 25, which is located at a position above the line of draft of the tractor. It should be understood that various implements embodying earth working tools, as well as other devices may be attached to the hitch, and for the sake of illustration, a disk cultivator 60 is shown in dotted lines in Figure 1, and with the cultivator attached as described, the crank 41 is rotated to raise or lower the draw bar 37 and likewise the draw bar 36 may be raised or lowered by actuating the crank 50, and since the draw bars 36 and 37 are pivotally mounted upon the upright channel members 14, the draw bars may be adjusted to different levels and thus regulate the depth at which the disks may engage into the ground. The control rod 25—55 is adjusted by rotation of the hand wheel 57 and by lengthening the combined length of the arm, it will be seen that a downward thrust is exerted upon an upper portion of the cultivator maintaining a certain working position of the disks of the cultivator, while by shortening the length of the rod 25 other working positions of the disks is inherent.

When it is desired to obtain further adjustments of the cultivator, this may be accomplished by the operator of the tractor by actuating a valve associated with the hose 58 to discharge fluid into the cylinders 28. Fluid entering the cylinders will move the piston rods 26 rearwardly moving the arms 33 in a corresponding direction and the arms 35 will partake of an upward arcuate movement about the rock shaft 30. The cultivator having a three point suspension upon the hitch 12 will be raised from the earth depending upon the length of travel of the piston rod 34, and obviously the full movement of the piston rod 34 will elevate the cultivator entirely from the ground so that the tractor may be moved to another location.

From the foregoing, it will be seen that a three point suspension hitch has been provided which is of a flexible character lending itself to numerous adjustments of earth working tools and which may be readily attached or detached from the axle of various types of tractors; and while a preferred form of the device has been shown and described, this is by way of illustration only, as various modifications in structure may be resorted within the scope of the appended claims.

What is claimed:

1. A three point suspension hitch for tractors comprising spaced upright channel members having clamp means adapted to be secured to the axle housing of a tractor, a rock shaft mounted adjacent the upper ends of the channel members, a bell crank lever on the ends of said rock shaft, said upright channel members having a pair of rearwardly extending draw bars, connecting means between one arm of each of said bell crank levers and said draw bars, one of said means being vertically adjustable, an arm fixed to each upright channel member and extending forwardly therefrom at a level below said rock shaft, a hydraulic cylinder pivotally mounted at a forward end of each arm, and having a piston rod connected to the other arm of said bell crank levers, an adjustable control rod connected intermediate the height of the upright channel members, said draw bars having means for connection to an implement to be drawn, and said control rod having a coupling for connection to said implement at a point above the connection to said draw bars.

2. A three point suspension hitch for tractors comprising spaced upright channel members having clamp means adapted to be securely fixed to the axle housing of a tractor, a rock shaft mounted adjacent the upper ends of the channel members, a bell crank lever on the ends of said rock shaft, said upright channel members having a pair of rearwardly extended draw bars, said bell crank members each having an inwardly offset fork member overlying respective draw bars, means connecting one arm of the bell crank levers with respective draw bars, one of said means being vertically adjustable, the other of said connecting means including an adjustable bolt cooperable with a stop on the adjacent upright channel member, an arm fixed to each upright channel member and extending forwardly therefrom at a level below said rock shaft, a hydraulic cylinder pivotally mounted upon a forward end of each arm, said cylinder having a piston rod for connection with the other arms of the bell crank levers, a U-shaped frame connected between said upright channel members, the bight portion of the U-shaped frame extending parallel to the rock shaft, a pivotal coupling mounted on said bight portion, a shaft connected to said pivotal coupling, said shaft having a threaded end, a sleeve having one end threadedly engaged upon said shaft, a threaded shaft in the other end of said sleeve, the threads of the first shaft being opposite to those of the last shaft, said last shaft having a pivotal coupling for attachment to a high point of an implement to be drawn by the tractor and said draw bars having means for connection with low points of said implement.

RICHARD L. DUGGER.

REFERENCES CITED

The following references are of record in the file of this patent:

UNITED STATES PATENTS

| Number | Name | Date |
|---|---|---|
| Re. 22,912 | Gaertner | Sept. 9, 1947 |
| 2,309,750 | Carrington | Feb. 2, 1943 |
| 2,324,840 | Hipple | July 20, 1943 |
| 2,351,473 | Benjamin | Jan. 13, 1944 |
| 2,356,231 | Ferguson | Aug. 22, 1944 |
| 2,395,322 | Evans | Feb. 19, 1946 |
| 2,445,145 | Love | July 13, 1948 |